United States Patent [19]

Johnson

[11] Patent Number: 5,195,413

[45] Date of Patent: Mar. 23, 1993

[54] SHEARING TOOL FOR PUNCH PRESSES

[75] Inventor: Gary E. Johnson, Ramsey, Minn.

[73] Assignee: Mate Punch & Die Co., Anoka, Minn.

[21] Appl. No.: 746,363

[22] Filed: Aug. 16, 1991

[51] Int. Cl.[5] .............................................. B26D 7/02
[52] U.S. Cl. ...................................... 83/132; 83/140;
83/277; 83/389; 83/552; 83/694; 83/636;
83/916
[58] Field of Search ................... 83/132, 137, 138, 139,
83/140, 143, 375, 383, 385, 388, 389, 452, 458,
277, 282, 636, 916, 552, 694

[56] References Cited

U.S. PATENT DOCUMENTS

| | | | |
|---|---|---|---|
| 2,394,346 | 2/1946 | Wiedman | 83/568 |
| 2,742,087 | 4/1956 | Smith et al. | 83/140 |
| 3,144,798 | 8/1964 | Leibinger | 83/410 |
| 3,227,024 | 1/1966 | Krebs | 83/568 |
| 3,540,339 | 11/1970 | Killaly | 83/140 |
| 3,717,061 | 2/1973 | Daniels | 83/409 |
| 3,835,741 | 9/1974 | Anderson et al. | 83/71 |
| 4,012,975 | 3/1977 | Lalone | 83/140 |
| 4,250,784 | 2/1981 | Bredow | 83/518 |
| 4,738,173 | 4/1988 | Kiuchi | 83/34 |
| 4,742,742 | 5/1988 | Yokoe | 83/459 |
| 4,774,865 | 9/1987 | Wallis | 83/128 |
| 4,981,058 | 1/1991 | Gavrun, III | 83/34 |

Primary Examiner—Hien H. Phan
Attorney, Agent, or Firm—James V. Harmon

[57] ABSTRACT

The invention provides a punch press and shearing tool which operate to provide a series of cuts linked end-to-end for severing a work piece such as a piece of sheet metal. The shearing tool includes first and second elongated, cooperating cutting blades. Each of the blades has a pair of slidably related faces that slide against one another in a plane of reciprocation. The cutting edges are oriented at a small angle, e.g. 2° to 6°, relative to one another to sever a piece of sheet stock progressively along a line with a scissor action. An intermittent work piece advancing motor shifts the work piece toward the cutting blades and parallel to the cut when the blades are apart. Gripping members can be yieldably mounted adjacent the cutting blades to grasp and forcefully hold the work piece in place as one blade moves toward the other. Yieldable stripper members on opposite sides of the second blade engage and independently deal with the stock on opposite sides of the cut.

6 Claims, 5 Drawing Sheets

SHEARING TOOL FOR PUNCH PRESSES

FIELD OF THE INVENTION

The present invention relates to a punch press and tool, and more particularly to a punch press and shearing tool to be used for forming an elongated cut in a sheet of material from a series of successive cuts.

BACKGROUND OF THE INVENTION

Shearing elements have been previously proposed for use in a punch press. For example, U.S. Pat. No. 4,738,173 describes a shearing device for use in a punch press. However, the punch and the die both include two adjacent blades with a specified angle, such as a 90° angle, between them. The punch is square in cross-section with two adjacent edges serving as two cutting blades at right angles to one another. The die has a square opening that receives the square punch head. The square end face of the square punch is inclined at a small angle to provide a high point at the intersection of the two edges. These two edges are used to cut sheet material along two perpendicular lines. A major objective of the present invention is to provide a punch press with a shear assembly for cutting stock along a single line rather than along two lines at right angles to one another.

There are also certain drawbacks in prior equipment. For example, problems can develop if the waste piece is able to bend and remain below the elevation of the lower shear. When this happens, waste material on one side of the cut which is bent down by contact with the shearing blade above it can catch on parts of the press when the sheet is moved for the next cut. This is, of course, unacceptable.

It is the present practice to conduct conventional punching operations on a punch press such as a turret-style press and, after all of the punching operations have been performed, remove the work piece and transfer it manually to a separate machine, namely, a conventional shear for separating pieces from one another. Therefore, it is another object of the invention to provide a shearing tool suited for use in a variety of commercially available punch presses, including turret punch presses, enabling a shearing operation to be conducted on the punch press along with conventional punching operations. In this way, the invention can be used to convert a conventional turret-style punch press station into a shearing station which can be used along with conventional punches present in the press to perform a shearing operation of any length, either before or after a conventional punching operation, and without removing the work piece from the punch press.

It is also an objective of the invention to provide a punch press shearing blade assembly in which two members that reciprocate relative to one another cooperate during use to cut sheet material with a single pair of shearing blades that have only one pair of parallel cooperating shearing edges. It is a further object to provide a reliable provision for seizing and securely holding the sheet material with a forceful grip just prior to and during each successive shearing step. It is another object to find a way of elevating the stock, typically the waste portion of the stock during each return stroke of the shear, so as to guard the shearing edges of both shearing blades and in that way prevent the stock from catching on the shearing blades or other parts. Another object is to provide a pair of spring loaded gripping members on opposite sides of the work piece which grip and securely hold the work piece and at the same time press the work piece toward the exposed face of one of the shearing blades. Another object is to provide a pair of spring loaded, yieldable lower stripper members that are 1) strategically located with respect to the lower shearing blade and 2) are capable of independent movement for dealing separately with the retained or "good" portion of the work piece and the "waste" portion of the work piece on the other side of the cut. A more specific objective is to provide a first pinching or gripping feature for grasping and holding the retained portion of the work piece and a separate, independently operable feature for lifting the other portion, typically the waste portion, of the work piece back to its original undeflected position following each successive shearing step.

A deficiency of prior rectangular punches used for separating parts is the unevenness of the cut produced by removing a series of rectangular waste pieces in rapid succession to produce an elongated cut between two parts. The jagged edge that results requires further processing which is, of course, undesirable. It is and object of the present invention to provide a smooth edge which shows virtually no unevenness and accordingly, requires no further processing to remove discontinuities and produces no waste.

These and other more detailed and specific objects of the present invention will be apparent in view of the following description setting forth by way of example but a few of the various forms of the invention that will be apparent to those skilled in the art once the principles described herein are understood.

THE FIGURES

SUMMARY OF THE INVENTION

The invention provides a punch press and shearing tool which operates to provide a series of cuts linked end-to-end for cutting a work piece such as a piece of sheet metal along a line defined by the successive cuts. The punch press, like most punch presses, includes first and second support elements mounted for reciprocatory movement relative to one another. There is usually an upper reciprocating element and a lower stationary element in a typical punch press. The new shearing tool includes first and second elongated, non-aligned cutting blades. Each blade is mounted on one of the support elements of the punch press. In operation, the blades reciprocate relative to one another. The blades include a pair of slidably related mating faces. These faces are aligned in the plane of reciprocation. Each blade has a single cutting edge at one end of its mating face for cutting the work piece. The cutting edges are oriented obliquely relative to one another within the plane of reciprocation so as to sever a piece of sheet stock progressively along a line with a scissor action as the blades move toward one another. An intermittent work piece advancing feature is present for shifting the work piece along the line of the cut toward the cutting blades when the blades are apart from one another between cuts. The blades thereby produce a series of cuts that form one long continuous cut.

In a preferred form of the invention, a gripper member is yieldably mounted adjacent a first cutting blade to force the work piece toward an exposed face of the second blade for grasping and forcefully holding the work piece in place as the first blade continues to move toward the second blade during each cut. It is also preferred that a pair of independently movable, yieldably supported stripper members are provided on opposite sides of the second blade for engaging and independently dealing with the stock on opposite sides of the cut. As each cut is made, the stock is deflected by the moving blade, typically in a downward direction. Provision is made for repeatedly lifting the deflected portion of the work piece back to its original position following each stroke of the moving blade. Terms indicating direction or position such as "upper" and "lower" or "fixed" are not intended to be limiting but are used merely for convenience to illustrate the invention by way of example.

DETAILED DESCRIPTION OF THE INVENTION

Figure 1:
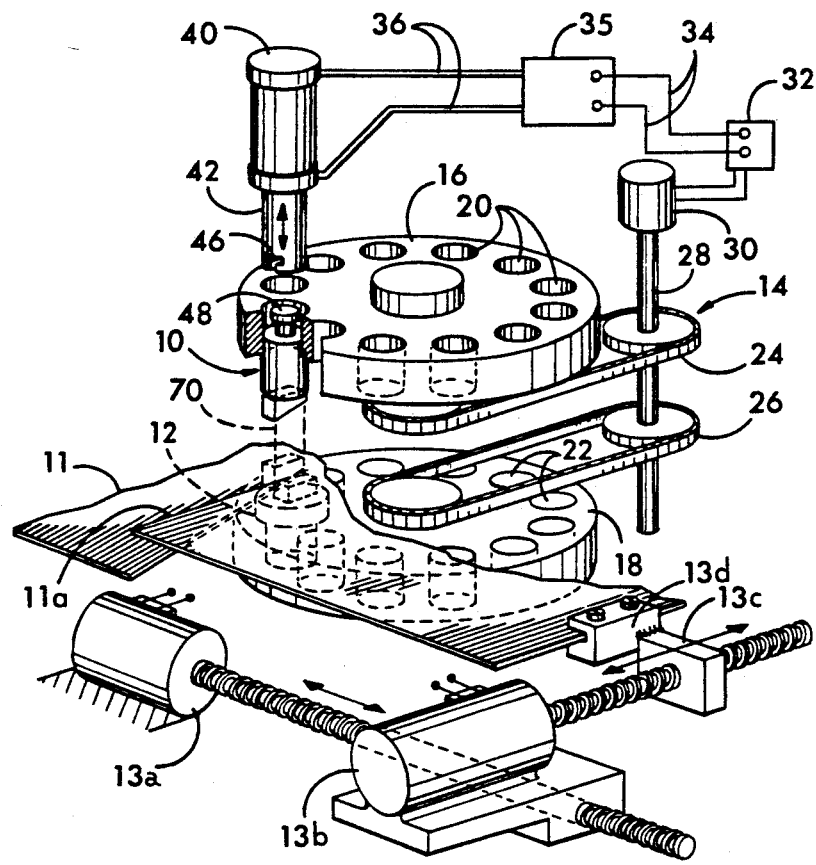
FIG. 1 is a diagrammatic perspective view illustrating one form of punch press and shearing tool in accordance with the invention.

As shown in FIG. 1, a shearing tool including an upper reciprocating portion 10 and a lower fixed portion 12 is provided to cooperate for shearing a work piece, such as a piece of sheet metal 11 along a relatively long cut or shear line 11a defined by a series of smaller cuts joined end-to-end as the moving portion 10 of the shearing tool reciprocates during operation.

A generally conventional turret-style punch press 14 is shown merely by way of example to illustrate any of various kinds of punch presses with which the invention can be employed. The turret-style press 14 includes upper and lower rotatably mounted coaxial punch and die holding turrets 16 and 18, respectively, each suitably mounted for rotation at its center, in this case one above the other. Each turret is provided with a series of circumferentially spaced apart axially extending aligned openings 20 and 22 for receiving cooperating punch and die sets (not shown) which function when in an operating station beneath a reciprocating punch head 42 that is reciprocated by means of a hydraulic punch cylinder 40. The punch head 42 is provided with a slot 46 to receive the tang 48 of an upper blade holder 50 supporting the upper shearing tool 10. During operation, the different punch assemblies in the openings 20, 22 are placed in operation in any desired succession by means of a motor 30 connected to a shaft 28 supporting a pair of chain and sprocket assemblies 24, 26 for rotating the turrets 16, 18 simultaneously to position the desired punch and die combination beneath the punch head 42 so that selected punches can be operated in succession as required.

When the blades are apart, the work piece 11 is advanced in mutually perpendicular directions by means of a pair of positioning motors 13a, 13b suitably connected by mutually perpendicular ball screws to a work piece holder 13c with a clamp 13d to which the work piece 11 is fastened. During operation, the controller 32, optionally as determined by a programmed series of electrical pulses, actuates motors 13a, 13b in a stepwise manner as required to advance the work piece 11 for producing the cut 11a at the point desired. The motor 13b and its ball screw, cooperating with the holder and clamp 13d, thus serve as a means for intermittently shifting the work piece 11 toward the cutting blades when the blades are apart from one another between cuts. Consequently, the long cut 11a is made up of a series of small sequential cuts positioned end-to-end by successive strokes of the blade 58 as the holder 50 and support 56 reciprocate.

When it is desired to operate the shearing tool assembly 10, 12 of the present invention, the motor 30 is operated by means of a controller 32 to place the tang 48 of the tool holder 50 within the slot 46 of the punch head 42. The shearing tool 10, 12 will then be ready for operation. Operation of the shearing tool 10, 12 is initiated by means of the controller 32 which actuates a hydraulic controller 35 via conductors 34. The controller 35 in turns causes the hydraulic cylinder 40 to reciprocate the punch head 42 and the punch holder 50, thereby repeatedly raising and lowering an upper cutting blade 58 relative to a lower stationary cutting blade 72 along a plane of reciprocation 70 which joins aligned edges 58d and 72a of the respective cooperating blades.

Figure 3:
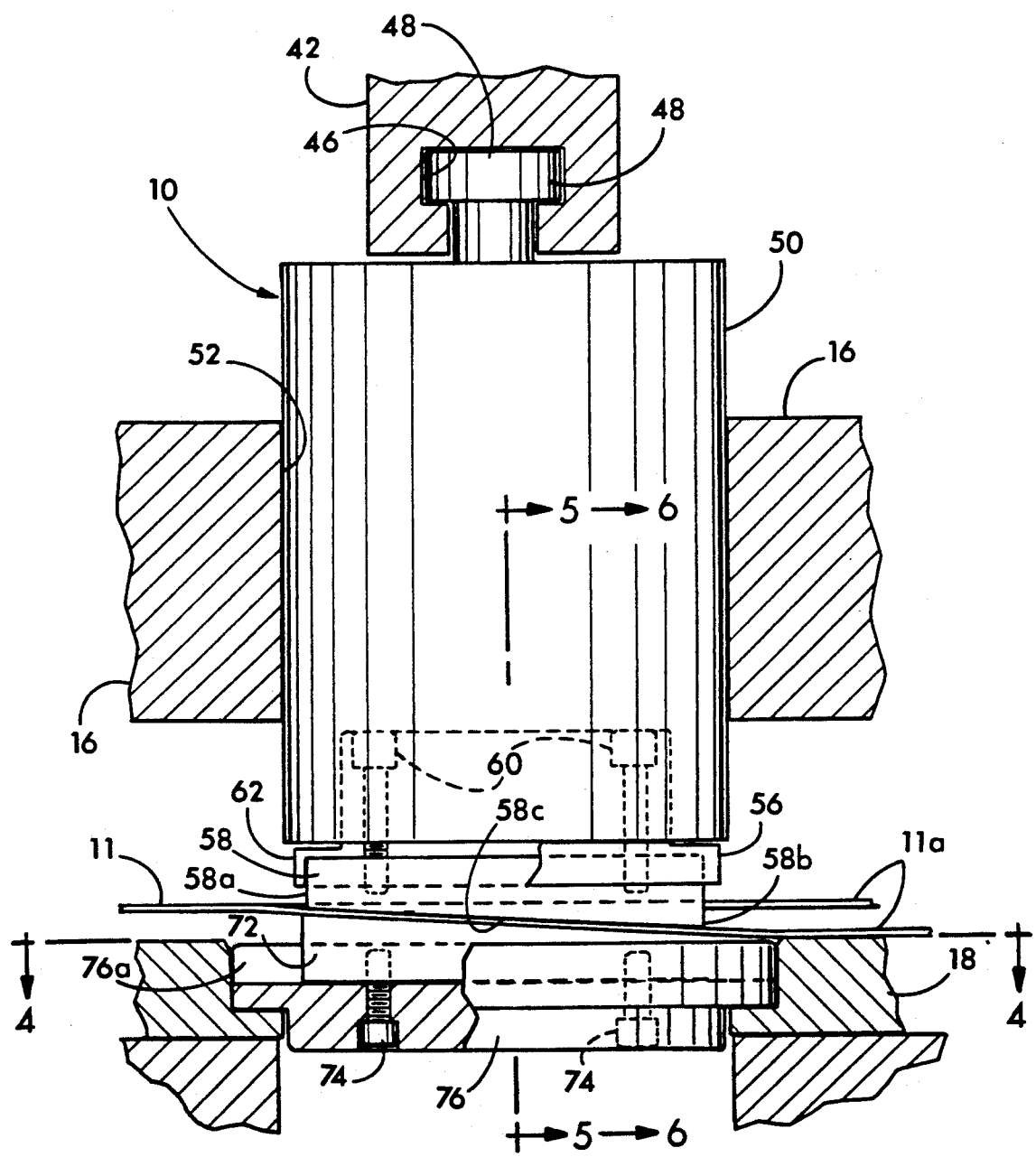
FIG. 3 is a side elevational view partly in section of a shearing tool in accordance with the invention as it appears at the end of a shearing stroke.
Figure 4:
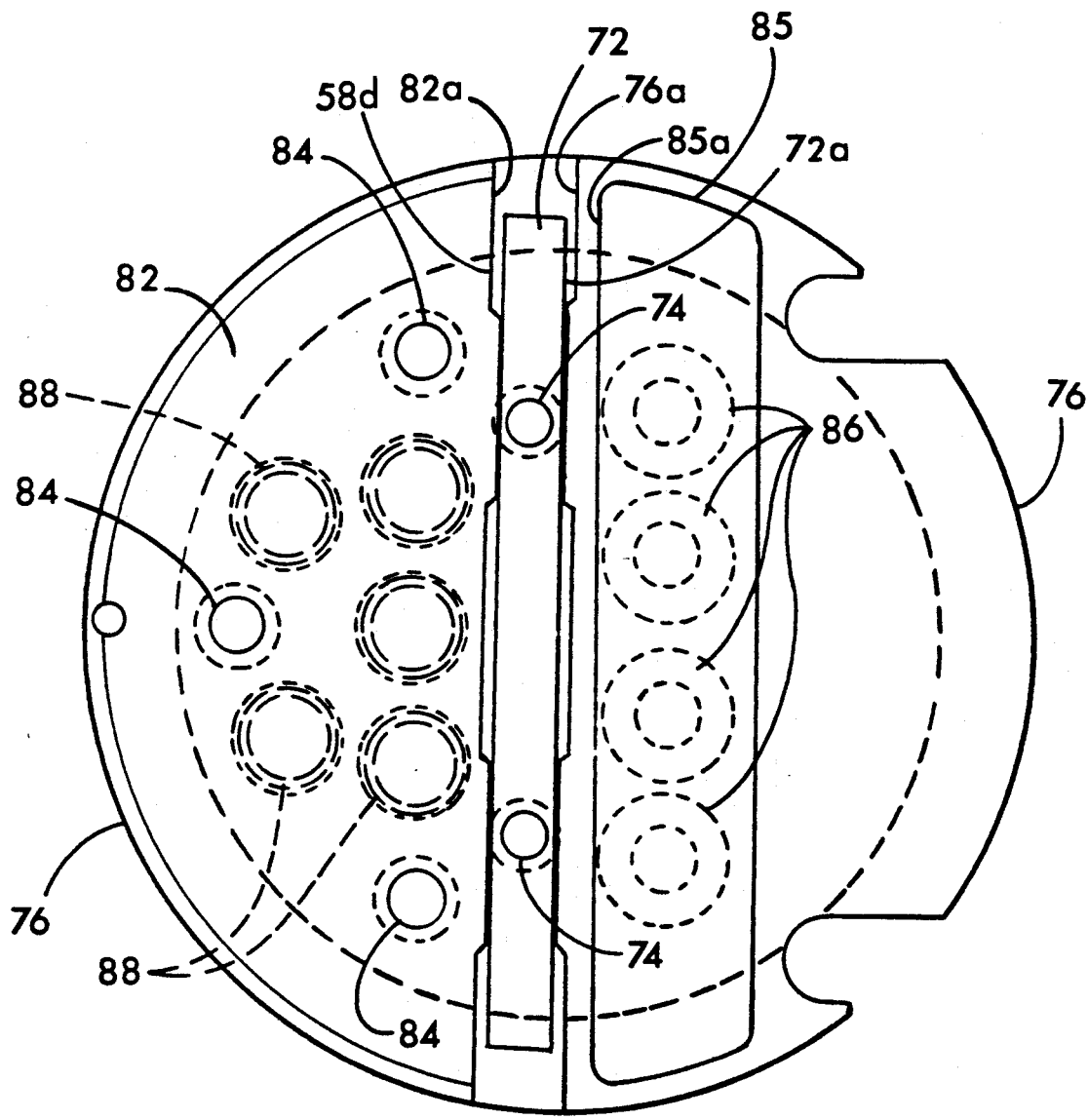
FIG. 4 is a plan view of the lower shearing blade and associated structure taken on line 4—4 of FIG. 3.
Figure 5:
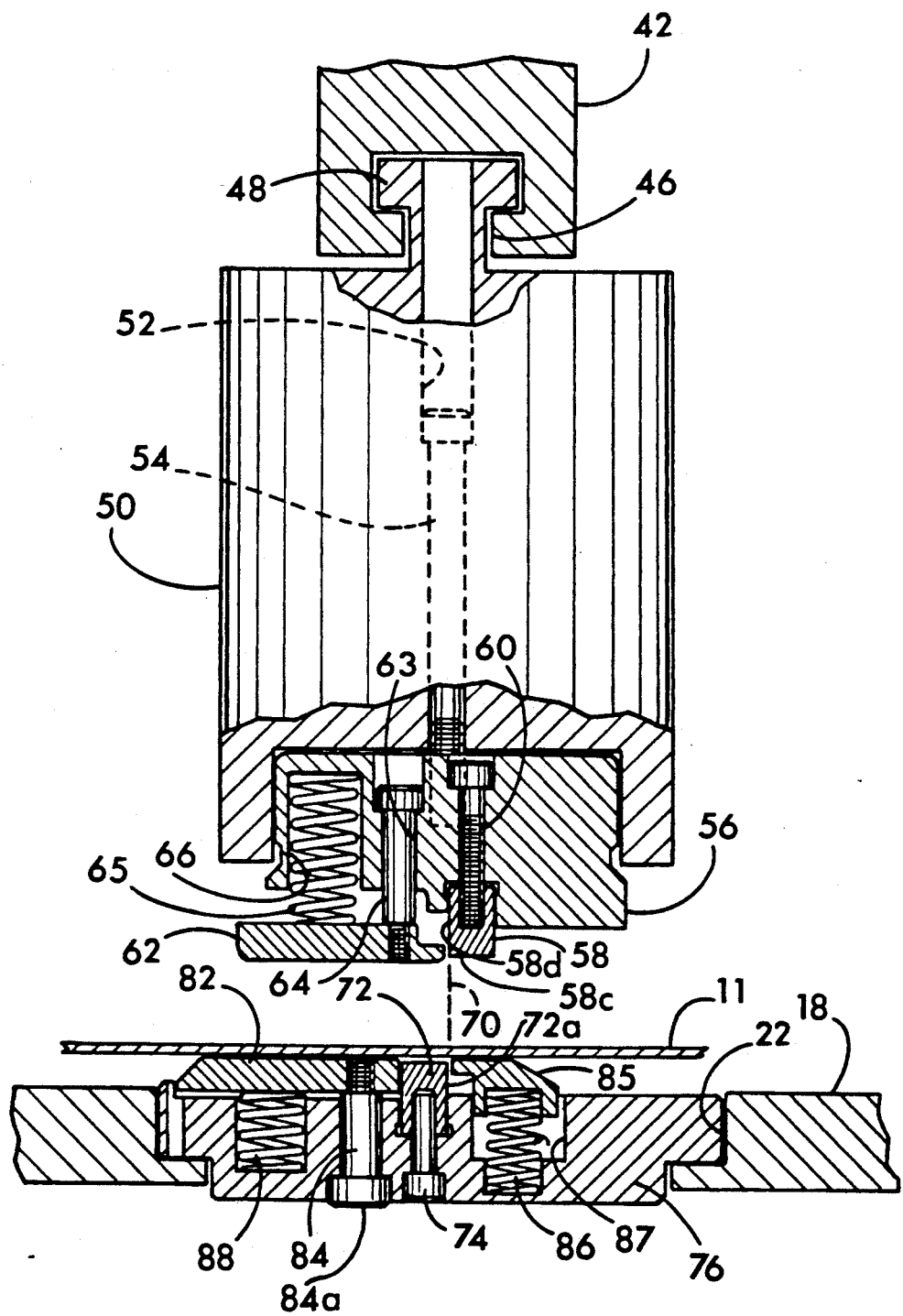
FIG. 5 is a vertical cross-sectional view taken on line 5—5 of FIG. 3 on a slightly reduced scale showing the blades apart.
Figure 6:
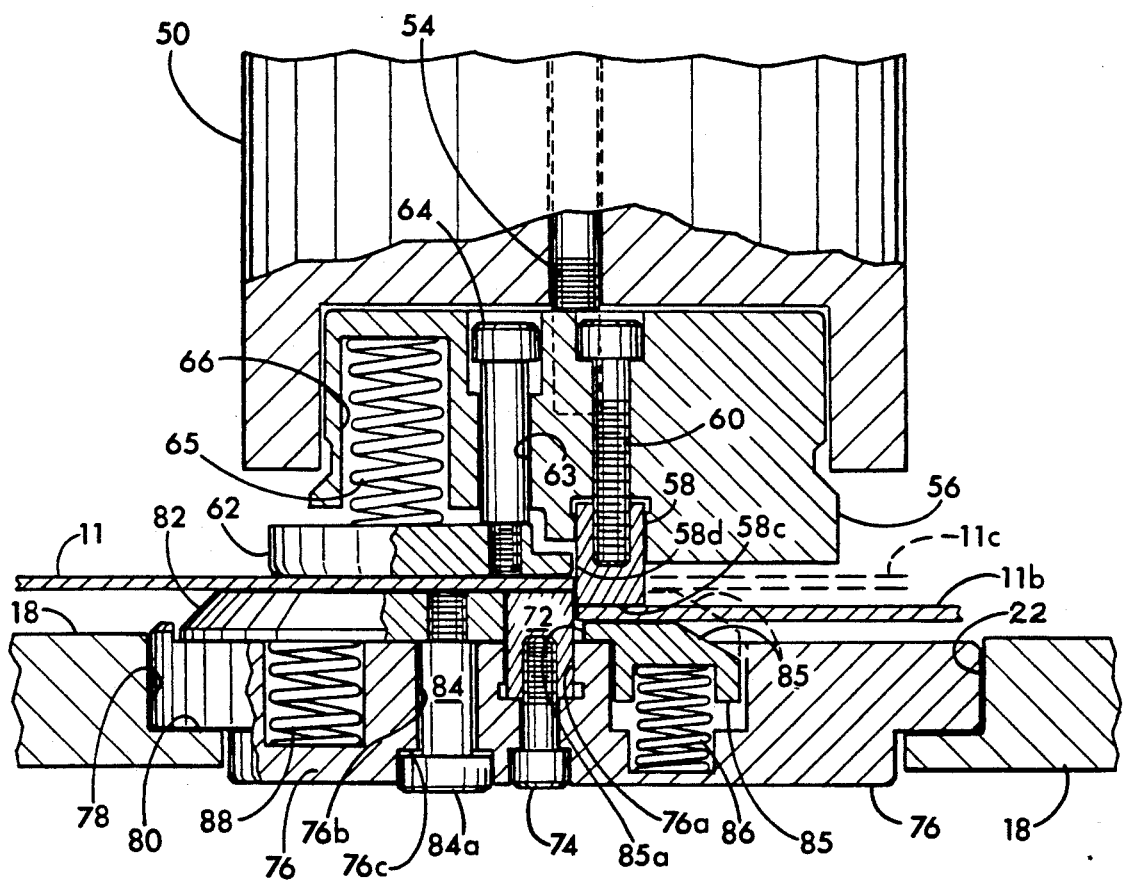
FIG. 6 is a vertical sectional view taken on line 6—6 of FIG. 3 on a larger scale showing the blades engaged.

The upper cutting blade 58 and associated structure will now be described in more detail with reference to FIGS. 3, 5 and 6.

The upper tool holder 50 is mounted for reciprocation along a vertical axis in an opening within the upper turret 16. Secured within a downwardly facing bore in the lower end of the upper tool holder 50 by means of a retaining bolt 54 is an upper blade support 56. The upper shearing blade 58 is held in the blade support 56 by a pair of fasteners such as bolts 60. Adjacent to the upper shearing blade 58 and positioned laterally thereof is a yieldably supported semi-circular stripper plate 62 having a lower surface that projects slightly below the exposed face 58c of the upper blade 58 when fully extended, e.g., 0.03 inches. The stripper plate 62 is yieldably and slidably retained in the upper blade support 56 by means of a pair of bolts 64 that are slidably mounted in bored openings 63 within the blade support 56. The heads of bolts 64 act as stops to limit the downward movement of stripper plate 62. The stripper plate 62 is biased in a downward, i.e. extended, position by means of a compression spring 65 that is held in a pocket within the blade support 56. It will be noted that a portion of the stripper plate 62 is positioned in opposition to, i.e. aligned with, the lower blade 72.

Figure 2:
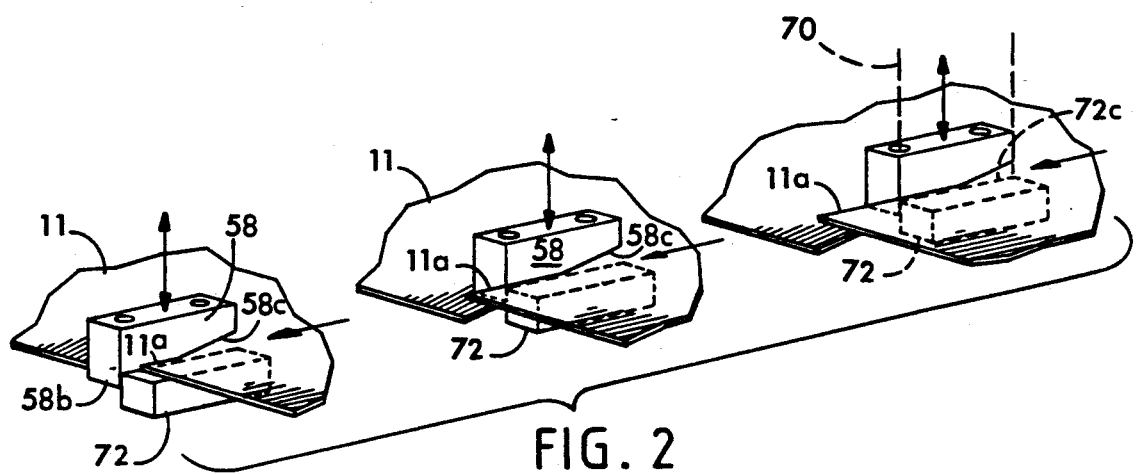
FIG. 2 shows three successive stages of operation in shearing a work piece in accordance with the invention.

Mounted in the lower turret 18 is a lower blade holder 76. In this case, the blade holder 76 is stepped and of an appropriate size to fit within a stepped bore 22 in the lower turret 18. The lower blade 72 is secured within a slot 76a in the blade holder 76 by means of a pair of fasteners such as bolts 74. It will be seen, for example in FIGS. 5 and 6, that the cutting blades 58, 72 are not in alignment with one another. As shown in FIG. 2, the cooperating cutting edges 58c and 72c of the respective blades are oriented at an oblique angle relative to one another within the plane of reciprocation 70. The blades typically intersect at an angle of about 2° to 6° so as to sever the work piece progressively along a line with a scissor action. A pair of stripper members 82, 85 are provided on opposite sides, i.e. laterally, of the blade 72. The stripper 82 is supported for vertical sliding movement on the blade holder 76 by the provision of a pair of laterally spaced apart vertically disposed supporting bolts 84 which are slidably mounted within corresponding bored openings in the blade holder 76. Each of the bolts 84 has a head 84a that serves as a stop for limiting upward movement of the stripper 82. The stripper 82 is yieldably biased in an upward direction by means of several, in this case five, compression springs 88 which are mounted in upwardly opening pockets in the upper face of the blade holder 76.

A rectangular stripper 85 is slidably recessed in an upwardly opening rectangular pocket 87 in the blade holder 76 and is yieldably biased in an upward direction by means of a plurality, in this case four, compression springs 86 that are mounted between aligned pockets at each end within the stripper 85 and the blade holder 76, respectively, for yieldably biasing the stripper 85 in an upward direction. The pocket 87 is somewhat larger than stripper 85 so that one end of the stripper 85 can be lowered with respect to its other end, thus allowing the stripper 85 to be cocked at an angle so as to conform to the inclined face of the blade 58. Both of the strippers 82 and 85 are normally, i.e. when fully raised to their resting position, slightly elevated, e.g. 0.03 inches, above the upper face of the fixed blade 72. When stripper 82 is fully lowered against blade holder 76, its upper surface is preferably flush with the top of the blade 72.

In operation, shearing is started from an edge of the work piece 11 from a hole therein.

During operation, as the upper blade 58 and blade holder 50 travel downwardly during the downward part of the cycle of reciprocation, the work piece 11 is supported by the strippers 82 and 85, slightly above the lower fixed blade 72. As the upper blade 58 continues to travel downwardly toward blade 72, the stripper plate 62 contacts and securely grasps the work piece 11 between itself and the stripper 82 slightly before the blades engage the work piece. As the upper blade 58 continues to descend, the upper stripper 62 is pressed upwardly against the compression spring 65. At the same time the strippers 82, 85 are forced downwardly. The work piece 11, usually the "good" or retained portion to the left of the cutting plane 70, is in this way securely held in place by the strippers 62, 82. The part of the work piece 11 above the blade 72 will be forced into contact with the blade 72 by stripper 62. This action securely and forcefully grasps or pinches the work piece 11 in place so that it can be cut with a high degree of precision. As the blade 58 travels downwardly to the lower end of its stroke as shown in FIG. 6, the portion of the work piece 11 to the right of the plane of reciprocation 70 is forced from its normal resting position 11c by deflecting it to a lower position 11d, thereby compressing the spring 86 and securely gripping and holding the piece 11b between the upper blade 58 and the stripper 85. As blade 58 is elevated after every downstroke, the stripper 85 will lift the deflected portion 11b of the work piece 11 back to its undeflected position 11c. This will help to prevent parts of the work piece 11 from catching on any part of the shearing tool.

The length of each cut is controlled by the distance that the punch holder extends toward the work. For longer cuts, shims (not shown) can be placed behind the upper or lower blade or the stroke can be changed. Sheet advancement distance is normally the same as the length of each successive cut, but it can be varied to provide an overlap between the cuts to achieve a desired edge quality.

The new shearing tool is highly effective in operation. The elongated blades 58, 72 which include only a single cooperating pair of cutting edges that slide relative to one another along a vertical plane reciprocation 70 extending between them to produce a series of cuts which join end to end to form a single long cut that is remarkably smooth, clean and free from discontinuities or irregularities. In fact, the resulting cut is smooth enough so that additional finishing is unnecessary. The points at which successive cuts are joined can be barely detected and no waste results. The strippers cooperate to securely engage the work piece 11. The strippers on opposite sides of the fixed blade 72 allow the retained piece 11 and the other piece 11b (usually the "waste" piece) to be dealt with separately. The cooperating strippers 62, 82 on opposite sides of the same portion of the work piece 11 enable the portion of the work at the left in the figures to be securely held and reliably retained in position during the cutting operation while the independently movable stripper 85 on the opposite side of the fixed blade 72 from stripper 82 enables the "waste" piece 11d to be handled separately from the main work piece 11 and to be elevated to its original position each time the upper cutting blade 58 is raised.

Many variations of the present invention within the scope of the appended claims will be apparent to those skilled in the art once the principles described herein are understood.

What is claimed is:

1. A shearing tool for a punch press having a first support element mounted for reciprocation relative to a second support element, said tool comprising, first and second elongated cooperating cutting blades, said blades having slidably related mating surfaces aligned in a plane of reciprocation whereby the blades engage each other on a single surface corresponding to said plane of reciprocation, each blade having a single cutting edge along one end of the mating face thereof for cutting a work piece, said cutting edges being oriented obliquely relative to one another within said plane so as to sever a piece of sheet stock progressively along a line with a scissor action as the blades move toward one another, intermittent work piece advancing means for shifting the work piece along a path aligned with said line toward the cutting blades when the blades are apart from one another between cuts, and a pair of separate, independently movable stripper elements are positioned laterally of the second blade and on opposite sides thereof, and each of the stripper elements is yieldably biased in the direction of the first blade for independently yieldably lifting the work piece when extended in a resting position above an exposed face of the second blade.

2. The shearing tool of claim 1 wherein one of the stripper elements is positioned in cooperative alignment with the first blade for engaging a portion of the work piece between itself and the first blade and for elevating the engaged portion of the work piece from a deflected position to lift the engaged portion back to its original position when the first blade is lifted.

3. A shearing tool for a punch press having a first support element mounted for reciprocation relative to a second support element, said tool comprising, first and second elongated cooperating cutting blades, said blades having slidably related mating surfaces aligned in a plane of reciprocation whereby the blades engage each other on a single surface corresponding to said plane of reciprocation, each blade having a single cutting edge along one end of the mating face thereof for cutting a work piece, said cutting edges being oriented obliquely relative to one another within said plane so as to sever a piece of sheet stock progressively along a line with a scissor action as the blades move toward one another, intermittent work piece advancing means for shifting the work piece along a path aligned with said line toward the cutting blades when the blades are apart from one another between cuts, a first stripper is yieldably mounted on the first support element adjacent the first blade for forcing the work piece toward an exposed face of the second blade so as to grasp and forcefully hold the work piece in place as the first support and first blade continues moving toward the second blade, a second stripper member is yieldably mounted laterally of the second blade and on only one side thereof such that said second stripper member is in alignment with the first stripper member so as to be positioned on the opposite side of the work piece therefrom whereby the first stripper member and the second stripper member cooperate with each other to engage and securely grip the work piece between them as the blades move toward one another, and after the blades move apart the second stripper member supports the work piece above an exposed face of the second blade, and a yieldably biased third stripper is provided on the opposite side of the second blade from said second stripper member and said third stripper is positioned in cooperative alignment with the first blade for engaging a portion of the work piece between itself and the first blade and for elevating the engaged portion of the work piece from a deflected position by lifting it back to an original position when the first blade is retracted.

4. A shearing tool and punch press comprising, a punch press having a first support element mounted for reciprocation relative to a second support element, said tool including first and second elongated cooperating cutting blades, said blades having slidably related mating surfaces aligned in a plane of reciprocation whereby the blades engage each other on a single surface corresponding to said plane of reciprocation, each blade having a single cutting edge along one end of the mating face thereof for cutting a work piece, said cutting edges being oriented obliquely relative to one another within said plane so as to sever a piece of sheet stock progressively along a line with a scissor action as the blades move toward one another, said press having work piece advancing means for shifting the work piece toward the cutting blades and along a path aligned with said line when the blades are apart from one another between cuts, a first stripper yieldably mounted on the first support element adjacent the first blade to force the work piece toward an exposed face of the second blade so as to grasp and forcefully hold the work piece in place as the first support and first blade continue moving toward the second blade, and a yieldably biased second stripper mounted on the opposite side of the second blade from said first stripper and said second stripper is positioned in cooperative alignment with the first blade for engaging a portion of the work piece between itself and the first blade and for elevating the engaged portion of the work piece from a deflected position to lift it back to an original position when the first blade is retracted.

5. The shearing tool of claim 4 wherein a third stripper member is yieldably mounted laterally of the second blade and on only one side thereof such that said third stripper member is in alignment with the first stripper member so as to be positioned on the opposite side of the work piece therefrom whereby the first stripper member and the third stripper member cooperate with each other to engage and securely grip the work piece between them as the blades move toward one another, and after the blades move apart the third stripper member supports the work piece above an exposed face of the second blade.

6. A shearing tool and punch press comprising, a punch press having a first support element mounted for reciprocation relative to a second support element, said tool including first and second elongated cooperating cutting blades, said blades having slidably related mating surfaces aligned in a plane of reciprocation whereby the blades engage each other on a single surface corresponding to said plane of reciprocation, each blade having a single cutting edge along one end of the mating face thereof for cutting a work piece, said cutting edges being oriented obliquely relative to one another within said plane so as to sever a piece of sheet stock progressively along a line with a scissor action as the blades move toward one another, said press having work piece advancing means for shifting the work piece toward the cutting blades and along a path aligned with said line when the blades are apart from one another between cuts, a first stripper yieldably mounted on the first support element adjacent the first blade to force the work piece toward an exposed face of the second blade so as to grasp and forcefully hold the work piece in place as the first support and first blade continue moving toward the second blade, and a yieldably biased second stripper mounted on the opposite side of the second blade from said first blade and said second stripper is positioned in cooperative alignment with the first blade for engaging a portion of the work piece between itself and the first blade and for elevating the engaged portion of the work piece from a deflected position to lift it back to an original position when the first blade is retracted, and a third yieldably biased stripper is mounted laterally of the second blade and in a position opposing said first stripper to assist the first stripper in grasping and holding the work piece.

* * * * *